US010162864B2

(12) United States Patent
Beaver et al.

(10) Patent No.: US 10,162,864 B2
(45) Date of Patent: Dec. 25, 2018

(54) READER APPLICATION SYSTEM UTILIZING ARTICLE SCORING AND CLUSTERING

(71) Applicant: Apple Inc., Cupertino, CA (US)

(72) Inventors: Donald R. Beaver, Pittsburgh, PA (US); Georgios Sofianatos, Cupertino, CA (US); Kang Tu, Cupertino, CA (US); Amogh Mahapatra, Santa Clara, CA (US); Mark A. Gingrich, San Jose, CA (US); Pushkaraj Bhirud, Cupertino, CA (US); Dominic J. Hughes, Cupertino, CA (US); Justin W. Sung, Cupertino, CA (US); Ravi Chandra Jammalamadaka, Santa Clara, CA (US); Martin J. Murrett, Portland, OR (US)

(73) Assignee: Apple Inc., Cupertino, CA (US)

(*) Notice: Subject to any disclaimer, the term of this patent is extended or adjusted under 35 U.S.C. 154(b) by 536 days.

(21) Appl. No.: 14/871,620

(22) Filed: Sep. 30, 2015

(65) Prior Publication Data

US 2016/0357753 A1 Dec. 8, 2016

Related U.S. Application Data

(60) Provisional application No. 62/172,144, filed on Jun. 7, 2015.

(51) Int. Cl.
*G06F 17/30* (2006.01)

(52) U.S. Cl.
CPC .... *G06F 17/3053* (2013.01); *G06F 17/30867* (2013.01)

(58) Field of Classification Search
CPC .......... G06F 17/3053; G06F 17/30867; G06F 17/30864; G06F 17/30598; G06F 17/30705
See application file for complete search history.

(56) References Cited

U.S. PATENT DOCUMENTS 8,307,110 B1 * 11/2012 Katzer ................ H04L 12/1859
709/232
9,223,897 B1 * 12/2015 Gross ................ G06F 17/30941
(Continued)

*Primary Examiner* — Merilyn P Nguyen
(74) *Attorney, Agent, or Firm* — Fletcher Yoder PC

(57) ABSTRACT

Aspects of the present disclosure involve a mobile or computer reader application that obtains articles or other computer files from a central database and displays the articles to a user of the device. In addition to providing the articles to the reader application, an article providing system may also determine the quality or popularity of particular articles and provide the most popular articles to users of the system. In one embodiment, the system may receive one or more anonymous interaction metrics from one or more devices connected to the system. The anonymous interaction metrics may be associated with a particular article and provide some indication of a user's engagement with the article. The system utilizes these interaction metrics or measurements to set or adjust a score or ranking associated with the particular article. The score may then be utilized by the system to rank the article in relation to other articles available through the system to provide the most popular or highest ranked articles to users of the system.

16 Claims, 12 Drawing Sheets

(56) References Cited

U.S. PATENT DOCUMENTS

| | | | |
|---|---|---|---|
| 9,680,961 B1* | 6/2017 | Katzer | H04L 12/1859 |
| 2008/0201348 A1* | 8/2008 | Edmonds | G06Q 30/02 |
| 2009/0259526 A1* | 10/2009 | Bechtel | G06Q 10/10 705/7.32 |
| 2010/0191742 A1* | 7/2010 | Stefik | G06F 17/30705 707/748 |
| 2011/0320437 A1* | 12/2011 | Kim | G06F 17/3089 707/722 |
| 2012/0005218 A1* | 1/2012 | Rajagopal | G06F 17/30654 707/749 |
| 2012/0215773 A1* | 8/2012 | Si | G06F 17/30864 707/723 |
| 2014/0359070 A1* | 12/2014 | Sundaram | H04L 67/2823 709/219 |
| 2015/0149600 A1* | 5/2015 | Thibeault | H04L 67/1097 709/219 |
| 2016/0259790 A1* | 9/2016 | Mashiach | G06F 17/3053 |

* cited by examiner

READER APPLICATION SYSTEM UTILIZING ARTICLE SCORING AND CLUSTERING

RELATED APPLICATIONS

This application claims priority under 35 U.S.C. § 119(e) to U.S. Provisional Application No. 62/172,144 entitled "READER APPLICATION SYSTEM UTILIZING ARTICLE SCORING AND CLUSTERING", filed on Jun. 7, 2015 which is incorporated by reference in its entirety herein.

TECHNICAL FIELD

This disclosure relates generally to mobile applications, and more specifically to a reader application that provides written articles or other types of files to a user of the application for consumption by the user on the user's mobile device.

BACKGROUND

As the popularity of computing devices increases, users more frequently obtain and consume information from the Internet through said computing devices. For example, many users access online magazines or newspaper websites through a browser or other Internet accessing application on the device to read or otherwise consume articles available through websites. Typically, however, the user must manually access the website to check the website for new content. Continuous checking of websites for new content may be time consuming for a user and a drain on resources of the computing devices.

In response, reader aggregators have been developed that instructs a browser of a computing device to constantly monitor a website for new articles or other content and inform a user of the feed of any updates. In some instances, the reader aggregator is configured to download all new articles or content uploaded to a website. The reader aggregator also generally provides a user interface through which the new content is available to be consumed. However, such reader aggregators are generally conduits through which all new information and/or articles from a website to which a user of the aggregator subscribes are collected. Analysis of the available content and configuration of the content provided to the aggregator are severely limited in typical reader aggregators.

SUMMARY

One implementation of the present disclosure may take the form of a method for managing content in a content database. The method may include the operations of receiving electronic content comprising an article-based computing file received at a first time of arrival, analyzing the received content file to determine an initial quality estimate of the received content file, and adjusting a priority of the received content file based at least on the initial quality estimate of the received content, the adjusted priority of the received content file comprising a second time of arrival, the second time of arrival before the first time of arrival. The method may also include the operations of assigning an initial score value to the received content comprising the adjusted priority and storing the received content file and the initial score value of the received content in a content database.

Another implementation of the present disclosure may take the form of a system for file sharing. The system may include a content miner obtaining a plurality of article-based computer files from a network of file sources and assigning a time of obtaining to each of the plurality of article-based computer files and an article scorer to analyze the plurality of article-based computer files to determine an initial quality estimate of the obtained computer files and assign an initial score value to each of the obtained plurality of article-based computer files, wherein the initial score value for a particular computer file of the obtained plurality of article-based computer files comprises an adjusted time of arrival of the particular computer file, the adjusted time of arrival earlier than an actual time of obtaining of the particular computer file. The system may also include an article database storing the plurality of article-based computer files and the initial score value for each of the plurality of article-based computer files.

Yet another implementation of the present disclosure may take the form of a scoring device for an article-providing system. The device may include at least one processor and a tangible computer-readable medium with one or more executable instructions stored thereon. When the one or more instructions are executed by the at least one processor, the operations of receiving electronic content comprising an article-based computing file, associating a time of arrival with the article-based computing file, and analyzing the received content file to determine an initial quality estimate of the received content file are performed. Additional operations may also be performed through execution of the instructions, such as adjusting a priority of the received content file based at least on the initial quality estimate of the received content, the adjusted priority of the received content file comprising a second time of arrival, the second time of arrival before the first time of arrival, assigning an initial score value to the received content comprising the adjusted priority, and storing the received content file and the initial score value of the received content in a content database.

DETAILED DESCRIPTION

Figure 1:
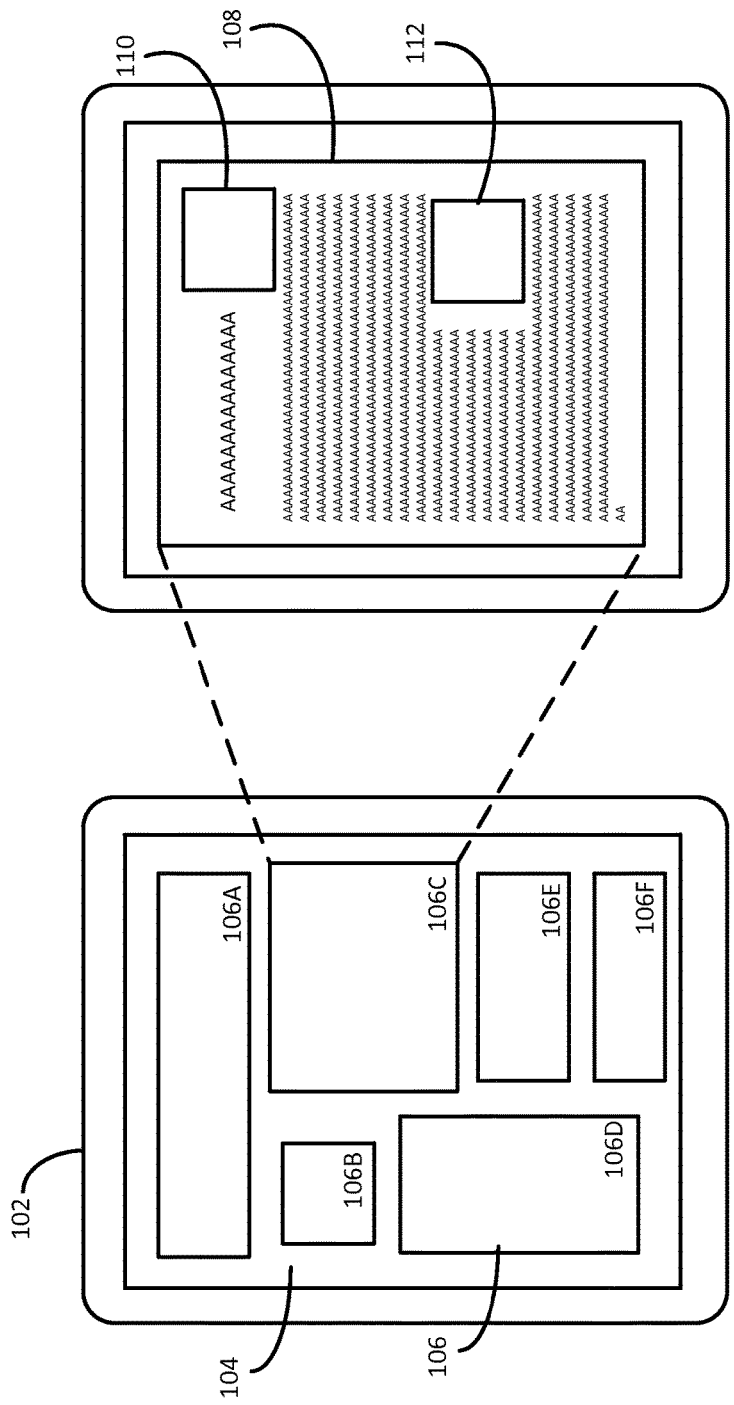
FIG. 1 is a front view of a mobile computing device executing a reader application for displaying one or more articles.

Aspects of the present disclosure involve a mobile or computer reader application that obtains articles or other computer files from a central database and displays the articles to a user of the device. In one embodiment, the reader application displays available articles within a user interface of the reader application. One or more of the articles may be selected by the user of the device to read or otherwise consume the article. In one particular embodiment, the articles are presented in the reader application as a series of cells or other indicators of the article's availability that may include portions of the article, such as the article title, a photograph, a portion of the article's text, and the like. Once selected, the article may encompass the entirety of the user interface of the reader application or a portion of the interface for reading by the user of the device.

In addition to providing the articles to the reader application, an article providing system may also determine the quality or popularity of particular articles and provide the most popular articles to users of the system. In one embodiment, the system may receive one or more interaction metrics from one or more devices connected to the system. The interaction metrics may be associated with a particular article and provide some indication of a user's engagement with the article. The system utilizes these interaction metrics or measurements to set or adjust a score or ranking associated with the particular article. The score may then be utilized by the system to rank the article in relation to other articles available through the system to provide the most popular or highest ranked articles to users of the system. Further, in one embodiment, the interaction measurements of the user may be transmitted to the system anonymously such that user identifiable information is stored separate from the system and user privacy is maintained.

An initial score may also be associated with an article stored in the database for ranking articles as they arrive in the database. In one embodiment, the initial score is normalized to a standard score and a time stamp of arrival associated with the normalized standard score is associated with the article. The adjusted time stamp of arrival may aid the system in limiting the updates made to the article database or a device server as new articles arrive and the ranking or scores associated with the articles are adjusted. The adjusted time stamp of arrival also allows for the system to provide articles of varying topics into a single feed to the reader application of the user.

In yet another embodiment, the system analyzes incoming articles to determine if an article is redundant to a previously stored article in the article database. Redundant articles may include articles that address the same topic or event without providing significant additional detail to the topic. Further, the system may rank redundant articles to determine a "best" article for that topic or event and provide the determined best article to users of the reader application. In one embodiment, the best article for a particular topic or event is associated with a selected topic or entity to which a user of the reader application is subscribed. Thus, the best article for a particular selected topic or entity may be different than the best article for another selected topic or entity, even though the articles are redundant as identified by the system.

A reader application is a program or application executed on a computing device that receives and displays articles or other types of data files for reading by a user of the application. The computing device used to execute the reader application may be any type of computing device, such as a personal computer, a laptop computer, a mobile phone, a tablet, and the like. One particular example of the reader application is illustrated in FIG. 1 as executed on a mobile phone device. In this example, a user of the device 102 selects a reader application on the device, such as through the selection of an icon on the device display. When executing, the reader application 104 provides a user interface that includes cells, links, or icons representative of available articles. In one embodiment, the user interface of the reader application 104 includes a list of available articles. In another embodiment, shown in FIG. 1, the reader application includes several icons 106, or "cells", that are selectable by a user of the device 102. To view an article, the user touches or otherwise selects the respective cell 106 to launch or otherwise access the article represented by the cell. In this manner, the articles available through the reader application 104 may be read or otherwise accessed by the user of the device 102.

In the embodiment illustrated in FIG. 1, the reader application 102 may alter the user interface provided to the user of the device 102 once an article is selected. In particular, when a cell 106c is selected, the article may be displayed on the device 102 to at least partially cover the user interface of the application. In general, the display of the selected article 108 is provided such that a user of the device 102 may read the text of the article or consume some other aspect of the data file (e.g., play a video). Additional portions of the article 108 may be available by scrolling down using the user interface, if additional portions of the selected article are present. For example, a user of the device 102 may use their finger to swipe up to access additional portions of the displayed article 108. The size and accessibility of the selected articles 108 in the reader application may be based on the type of device used to view the article, the type of article selected, the content of the article, and the like. In general, the appearance of the article 108 within the reader application user interface 104 may utilize any amount of space of the device display. Further, accessing the portions of the article may be accomplished through any type of interaction with the reader application 104, including utilizing one or more input/output devices or through a touchscreen of the device 102.

Although discussed herein as a text-based file, it should be appreciated that the articles available through the reader application 104 may be any type of electronic content or computer data file. For example, the article may include images 110, embedded videos 112, music or other audio files, graphic interchange format (GIF) images, text, links to webpages or other documents, and the like. In one particular embodiment, the articles available through the reader application include web-based documents created through one or more publishers of web-based content and provided to or gathered for displaying within the reader application 104. In other embodiments, the articles may be from Rich Site Summary (RSS) feed of articles and/or from publishers utilizing as article writing program utilizing the JavaScript Object Notation (JSON) standard format. Regardless of the article format type, the articles may be created specifically for the reader application 104 for use by users of the reader application.

Figure 2:
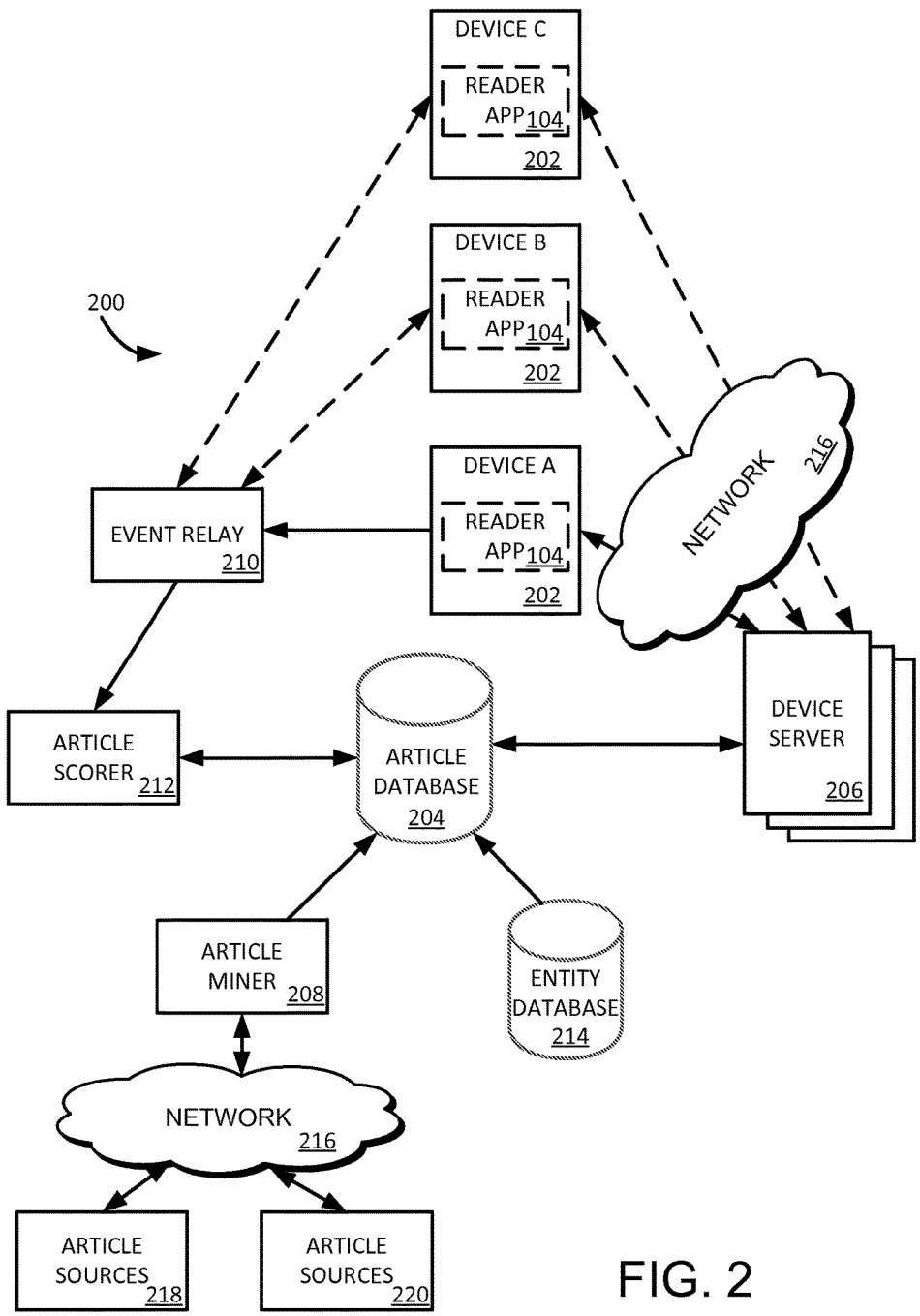
FIG. 2 illustrates a system architecture for providing articles to a reader application of a mobile device.

FIG. 2 illustrates a system architecture for providing articles to a reader application 104 of a mobile device. The system 200 may be used to provide one or more articles to a reader application executing on a computing device 202, such as the mobile device described above. The components of the system 202 may communicate over any number of networks, including telecommunication networks and wireless networks. Further, although illustrated in FIG. 2 as including particular components, it should be noted that the system 200 may include any number of additional or fewer components, including components used to communicate between the components shown. Also, the functionality of the components described below may be applied to two or more components of the system. For example, the article database 204 and the device server 206 may be instantiated in the same device, or may be instantiated over many components of the system 200. When distributed over a large number of devices across a large national or international geography, articles (content) may be cached through a network, and numerous servers 206 may be used to distribute articles to readers, such as might be available with a content delivery network architecture.

As discussed above, the system 200 includes a computing device 202 utilized by a user of the reader application to view articles provided to the device by the system. The device 202 communicates with a device server 206 through wired or wireless communication, such as provided on network 216, which may be public or private or a combination thereof. In general, the device server 206 provides data to one or more devices associated with the system. The device server 206 requests and receives one or more articles from an article database 204 to provide to devices 202 in communication with the server. The device server 206 may also perform one or more of the operations described below to configure the articles provided to the reader application based on one or more parameters of the reader application monitored by the user device 202. Further, it should be appreciated that any number of such devices 202 may be connected to or otherwise associated with the system in a similar manner. In one embodiment, thousands of such devices 202 are in communication with the device server 206 to receive articles from the system. The various other computing devices 202 that may form a portion of the system are illustrated in FIG. 2 as device B and device C, although the following description of the system may only discuss the operation of device A, for simplicity.

The article database 204 is a store of articles available to users of the reader application 104. As mentioned, the articles stored in the article database 204 may be any type of computing data file. To populate the article database 204, an article miner 208 module is configured to gather or otherwise receive articles for inclusion in the article database. In one implementation, the article database 204 may be distributed across many physical devices geographically dispersed, and may include origins and edges, depending on the implementation. In one example, a publisher 218 or creator of articles provides articles to the article miner 208 that is operably connected with the article database 204. In another example, the article miner 208 may access one or more websites 220 to obtain links or copies of articles to include the article database 204. Regardless of the origin of the articles, the article miner 208 serves to populate the available articles of the system 200 by storing articles in the database 204.

As discussed in more detail below, each or some articles stored in the article database 204 may include a score or other form of ranking. In general, the article score may reflect initial quality characteristics calculated from various possible metrics for the article, and may reflect the relative popularity of the article to the users of the article system 200. In one embodiment of the system 200, the article score is calculated and associated with the articles by the article scorer 212. The article scorer 212 may provide an initial score to the article when provided by the article miner 208 to the database 204. Further, the system 200 may utilize information concerning the popularity of the article received from one or more device 202 of the system. Thus, an event relay 210 component of the system 200 is configured to receive usage information for articles provided to the devices 202 of the system. Upon receiving the information, the article scorer 212 component may adjust the score associated with an article to further refine the score for the article. In the embodiment of the system 202 that includes any number of devices 202, usage information may be received from each or some of the devices to obtain a large amount of information about a particular article. The utilization of an article score is discussed in more detail below to aid the system in determining the number and types of articles to provide to the reader application on the device 202.

Although the event relay 210 receives information of the relative popularity of a particular article from one or more devices 202 associated with the system 200, it should be noted that such information may not include identifying information of a particular user of the device or system. For example, the device 202 may protect the identity of a user of the device 202 by transmitting usage information of a particular article anonymously to the event relay 210. In particular, each device 202 of the system 200 may include an anonymous and alterable identification that identifies the device as a part of the system, but does not include any information about a user of the device. In one implementation, the anonymous identification may be changed by the device to further protect the identification of a user of the device. As long as the system 200 can identify the device 202 as being a part of the system, personal identification of a user of the device is not needed by the system and, in particular, is not transmitted to any other component in the system. In this manner, usage information for a particular article may be received and analyzed by the system to adjust the scoring of an article without associating the information with a particular user of the system 200. In other words, the information gathered by the event relay 210 may be general population information regarding the particular article and not information specific to any one user of the system 200. As such, the privacy of the users of the system 200 is maintained while also providing a system that may adjust to elevate interesting or high quality articles through the adjustment to the score associated with one or more articles in the article database 204.

The system 200 may also include an entity database 214 that stores any number of topics, or "entities", which may be associated with an article in the article database 204. In general, each article in the article database 204 is associated with a set of entities that describes some topic of the article. For example, an article about a baseball game may include specific entities such as entities of each of the particular teams involved in the game, entities for players involved in the game (whether specifically mentioned in the article or not), entities for the location at which the game was played, and more general entities, such as "baseball", "sports", "news", and the like. Other entities of the article may identify the author and/or publisher of the article. Any number of entities may be associated with the article to aid the system 200 in classifying the articles within the article database 204 and providing articles of interest to users of the reader application.

In one embodiment, the entity database 214 is populated with potential entities manually by one or more administrators of the system. In another embodiment, the entities may be automatically culled or gathered from any type of database of potential article topics. For example, the system 200 may access a publicly or privately edited collection of potential article topics, such as an interconnected collection of web pages, to include in the entity database 214. The collection of web pages may be accessibly by the system through several internet protocol (IP) addresses and processed to obtain information for inclusion in the database. The collection of web pages may be general knowledge information or may be specific to a particular area of study, such as medicine or technology. Moreover, multiple database stores of article topics may be parsed and the results aggregated. The list of entities in the entity database 214 may also include identifications of channels or publishers that provide articles to the system 200. Regardless of how the entity database 214 is populated with potential entities, at least one entity may be associated with an article stored in the article database to indicate to the system the topics included in the article. Further and as explained in more detail below, a user of the reader application may select one or more entities in which the user is interested to receive articles pertaining to the selected entity. In this manner, the types of articles received at the reader application executed on the device 202 are configurable to the user's interests.

Through the reader application, a user of the device 202 receives articles from the device server 206 of particular interest to the user. In one embodiment, the articles are provided to the reader application in feeds. For example, one feed of articles provided to the device 202 is a topic or entity feed such that the articles provided are specified by one or many instances of the entity associated with an entity by the system. Another feed includes a feed of articles from a particular publisher or article provider. Yet another feed includes articles from several entities selected by the user and is presented to the user in the reader application interface as a mixed collection of articles. For example, a particular user may select a "sports" entity and a "photography" entity to receive articles pertaining to each of those topics. In this example, the user's reader application may receive a "sports" feed of articles, a "photography" feed of articles, and a feed that includes a mix of both "sports" articles and "photography" articles. Thus, receiving available articles at the reader application is configurable by the user to enhance the user's experience and increase the likelihood that the user receives articles of the user's liking.

Another feed may be presented that includes any type of article selected by the system 200 to provide to users of the reader application.

As mentioned above, the article scorer 212 may provide an initial or static score to the article when provided by the article miner 208 to the database 204. In general, the static score assigned to a particular article of the article database 204 is an estimate on the possible popularity of the article with users of the reader application and may be based on any aspect of the article. For example, the static score may be based on the topic or entities associated with the article, the publisher of the article, the number of sentences in the article, the number of paragraphs in the article, and the like. As such, the article miner 208 or article scorer 212 analyzes the incoming article and, based on that analysis of the content of the article, assigns an initial or static score to the article. In another embodiment, each article received at the article database 204 is assigned the same initial score. Regardless of how the initial score is assigned, the score may be stored in the article database 204 along with the article.

In one embodiment, the system 200 includes an "exploration" bin in the article database 204 or device server 206. The exploration bin is configured to provide newly received articles to the article database 206, to a random or focused group of devices 202 associated with the system 200. In one example, these devices 202 may be those associated with heavy readers or users of the reader application. In another example, any type of reader or device 202 using the reader application may receive the articles from the exploration bin. After some time has elapsed (such as 10 minutes or one hour), the system 200 receives anonymous information concerning the popularity, quality, and/or other attributes of the article in the exploration bin from the event relay 210 and a score is associated with the article (through the article scorer 212) and stored in the article database. Such information may be obtained by the device 202 and transmitted to an event relay 210 of the system 200 anonymously such that no identifying information of a user of the device is transmitted to the system. In one implementation, the device utilizes the anonymous identification of the device 202 discussed above. In yet another example, the system 200 scores the article after receiving a particular number of article surveys from the devices 202 of the system rather than after a set period of time.

Figure 3A:
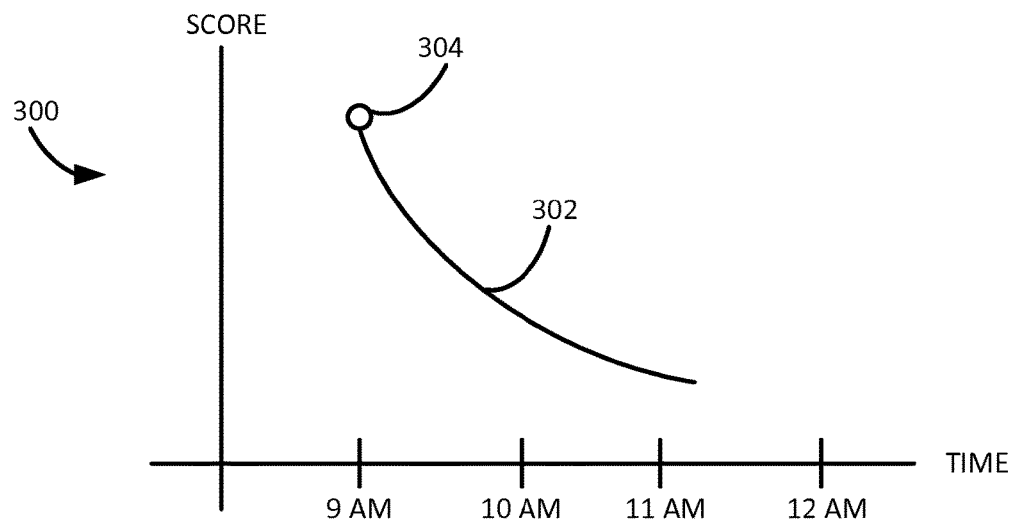
FIG. 3A is a graph illustrating a decay rate associated with an article of an article providing system.

Regardless of how an initial score is assigned to an article, each article may be associated with a rate of degradation or decay. Such a decay rate is associated with the articles in the article database 204 because articles may be assumed to be less popular as they become older. In other words, the system 200 preferences newer articles over older articles. One particular example of a delay curve for a particular article is illustrated in the graph of FIG. 3A. The graph 300 includes a time scale along the x-axis and an article score along the y-axis. The initial score of the article as determined through a method described above is illustrated as point 304 along decay curve 302 for the particular article shown. Also, the graph illustrates that the article was received at the article database 204 at 9:00 am with an initial score 304. However, as time elapses (as the graph moves right along the x-axis), the score associated with the article follows the decay curve 302. In one particular example, articles stored in the article database 204 decay along the decay curve 302 defined by $x=e^{-\lambda t}$, with $\lambda$ being a decay rate coefficient for the particular article of the graph 300 and t is elapsed time since the article arrives. However, it should be appreciated that the articles may decay at any rate based on elapsed time defined by any decay curve. For example, the article score may decay at a constant rate as time elapses, eventually reaching a score of zero at some point in time. In another example, the article decay rate may follow a decay curve, but be implemented in a piecewise fashion. Thus, the change in the score associated with the article may be adjusted downward or lower in steps. These are but a few examples of how the scores of the articles of the system 200 are degraded or decay over time.

Further, the decay rate of an article may be dependent on the type of article. More particularly, the decay rate associated with a particular article may be dependent upon an entity associated with the article. As described above, a user of a reader application may subscribe to receive articles associated with a particular topic or "entity". Thus, each article is assigned one or more entities that describe the topic or topics of the article. When a user of the reader application subscribes to an entity, all or some of the articles stored in the article database associated with that entity are provided to the user's reader application. In one embodiment of the system, the decay rate associated with the article is dependent on the entity to which the user is subscribed and the article is associated.

Figure 3B:
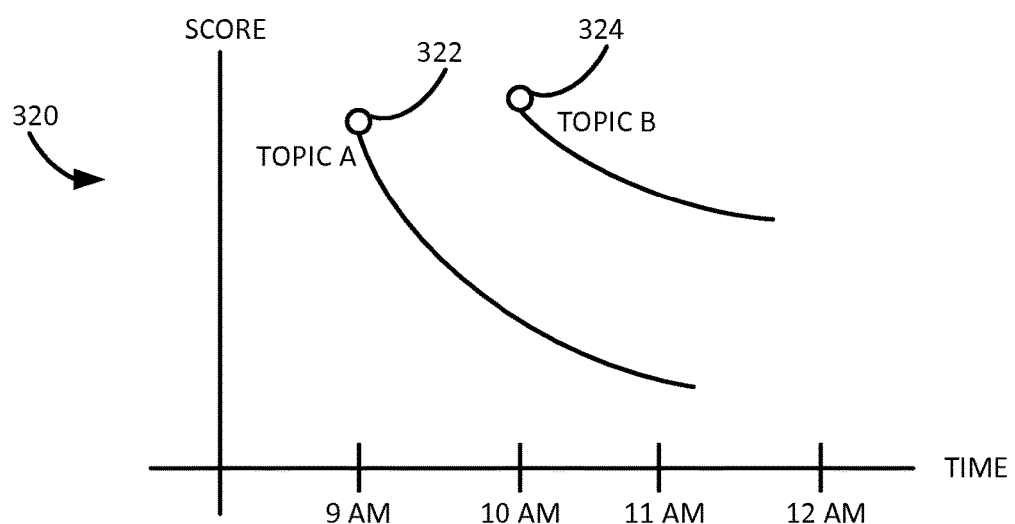
FIG. 3B is a graph illustrating different decay rates of different articles of an article providing system.

FIG. 3B is a graph 320 illustrating different decay rates of different articles of an article providing system. In particular, the graph 320 includes a time scale along the x-axis and an article score along the y-axis. The graph 320 illustrates a first decay curve 322 for a first article associated with a first entity and a second decay curve 324 for a second article associated with a second entity. As shown, the decay curve 324 for the second article is less steep than the decay curve 322 for the first article. In one example, this decay curves are expressed by $x=e^{\lambda t}$, with each curve having a different $\lambda$ value. In one embodiment, the different decay curves associated with each article entity are applied by the system 200 based on an assumption of the relative popularity of the topics over time. For example, scores for articles associated with news-based entities, such as sports scores, may decay at a faster rate than those articles associated with general topics, such as photography. In other words, the system 200 may assume that the articles of general topics or entities interesting to a reader for longer periods than those articles of news-based topics or entities. However, the decay rates associated with the articles may be set by the system 200 for any reason and any decay rate may be associated with any type of entity.

In one embodiment of the system 200, articles are provided to the device 202 from the article database 204 through the device server 206 in response to a user of the device subscribing to an entity or channel. Upon receiving a subscription request, the system 200 provides a related decay rate or curve associated with the entity or channel. Further, when providing an article to the device associated with the subscribed entity, the system 200 also provides an indication of when the article was stored in the article database 204, or a time stamp of the article receipt. In one embodiment, the system 200 provides the time stamp of article receipt in the database 204 when transmitting the article to the reader application. Upon receipt of an article associated with or otherwise related to the subscribed entity, the device determines a relative score for the received article based on a decay rate for the subscribed entity and the time stamp of article receipt at the database 204. The device then utilizes the calculated score for the article to display the article in the reader application feed.

In particular, the reader application may be configured to organize the articles received at the application based on the article scores. For example, the reader application displays the articles with the highest score near the top of the user interface 104. In other words, the cells 106 are arranged in the reader application feed of articles with the highest scoring articles near or at the top of the display 104. The determined scores for the articles, including the decay rate associated with the articles, are thereby utilized to organize the cells 106 in the reader application for the available articles. However, the scores calculated for each article may be utilized by the reader application for any reason, with the organization of the articles in the user's feed being one particular reason.

Figure 4:
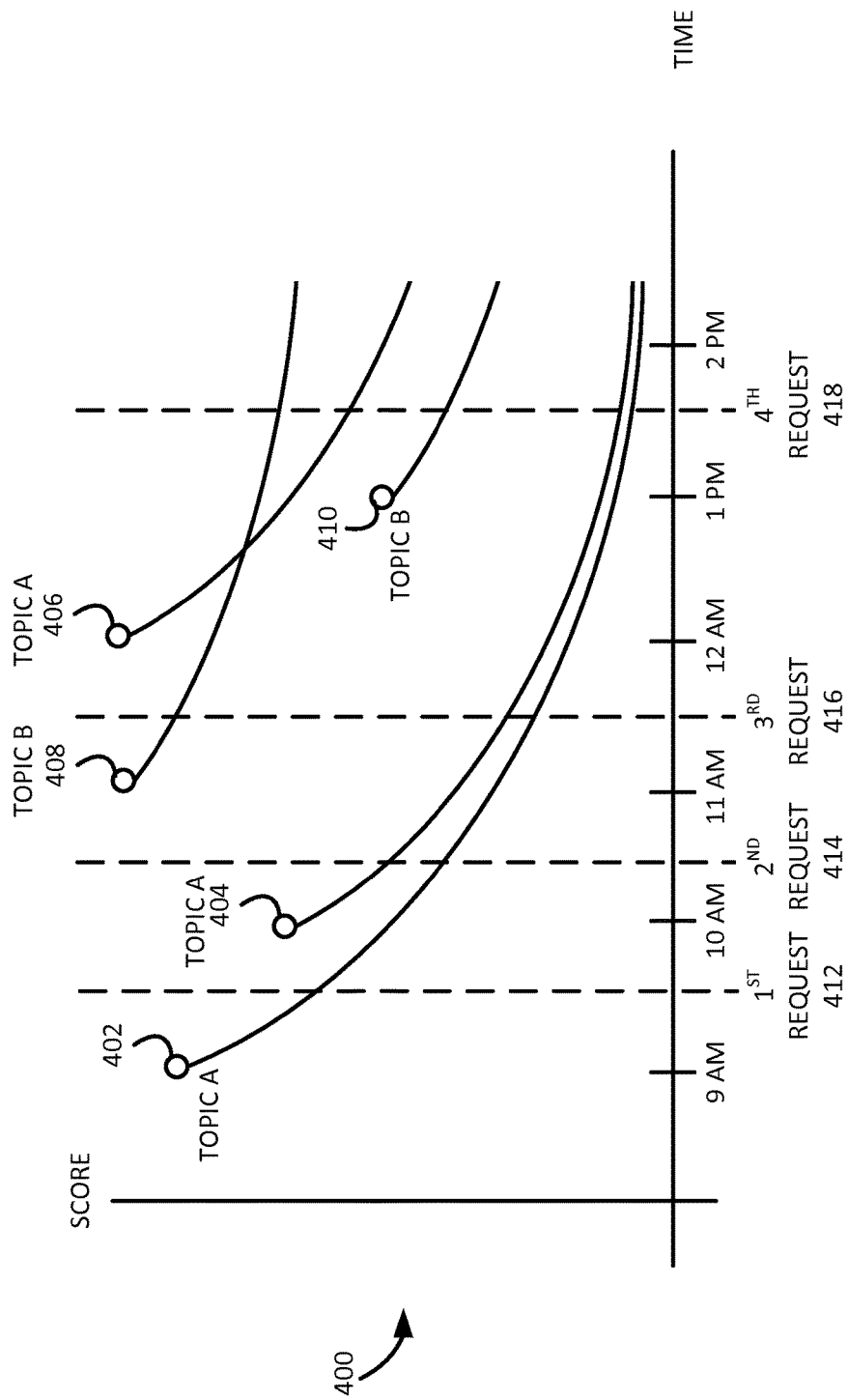
FIG. 4 is a graph illustrating the scoring of several articles by a device receiving the articles from a device server.

As discussed above, the reader application may include a user interface that provides cells 106 for articles of several entities to which the user of the reader application is subscribed, including articles with different decay rates or curves. FIG. 4 is a graph 400 illustrating the scoring of several articles by a device receiving the articles from a device server. Similar to the graphs above, the graph 400 includes a time scale along the x-axis and an article score along the y-axis. The graph 400 also illustrates the receipt of several articles 402-406 for a first topic, labeled as "topic A", at an article database 204. The graph 400 also illustrates the receipt of several articles 408-410 for a second topic, labeled as "topic B", at the article database 204. As shown, the decay curve for the topic A articles 402-406 is different than the decay curve for the topic B articles 408-410, as described above. In particular, the graph 400 demonstrates the article database 204 receiving a topic A article 402 at 9:00 am and a topic A article 404 at 10:00 am. The topic A article 404 received at 10:00 am has a lower initial score than the topic A article 402 received at 9:00 am. At 11:00 am, the article database 204 receives a topic B article 408 with a high score, a topic A article 406 at 12:00 am with a high score, and a topic B article 410 at 1:00 pm with a low score. The article types and times of arrival at the article database 204 are used herein merely as examples. In general, the articles 402-410 may arrive at any time with any initial score and associated with any entity of the system 200.

In one embodiment of the system 200, the decay rates associated with the articles of the graph 400 is provided to the device 202 when a user of the reader application subscribes to receive articles for a particular entity. Also, the graph 400 of FIG. 4 indicates particular instances or times when a device 202 accesses articles provided to the device for display within the reader application of the device. In particular, a user of the device 202 utilizes the reader application of the device at a time 412 between 9:00 am and 10:00 am as shown on the graph. At this point in time, the reader application requests the topic A article 402 that arrived at the article database 204 at 9:00 am. The article, along with the time of receipt (9:00 am), is transmitted to the device 202 for display in the reader application. Prior to display, the device 202 calculates the relative score for the topic A article 402 with the decay rate associated with particular entity (topic A). At this point, the topic A article 402 may be displayed in the reader application with no other available articles.

At a second time 414 (between 10:00 am and 11:00 am), the reader application is accessed again. Because a second topic A article 404 arrived in the article database 204 at 10:00 am, the second topic A article 404 is transmitted to the device 202 along with the time stamp of arrival. Further, in this embodiment, the initial score for the article 404 may also be transmitted for accurate calculation of the time decayed score for the article. Regardless, the device 202 calculates the time decayed score for the first topic A article 402 and the second topic A article 404 and displays the articles in the reader application according to the calculated scores. In this example, the second topic A article 404 is displayed above or higher than the first topic A article 402 as the second topic A article has a higher calculated time decayed score.

Continuing the example, a first topic B article 408 is received at the article database 204 at 11:00 am. The reader application accesses the system 200 at a third time 416 between 11:00 and 12:00 am. Upon accessing the system and receiving the requested articles, the device calculates a time decayed score for each article. In this example, the first topic B article 408 is displayed at the top of the user interface of the reader application based on the calculated time decayed score, followed by the second topic A article 404 and the first topic A article 404. Also, the device 202 applies a different decay curve calculation to the topic B article 408 than is applied to the topic A articles 402-404.

At 12:00 am, a third topic A article 406 is received with a high score, followed by a second topic B article 410 at 1:00 pm. The next time 418 the device 202 accesses the reader application and requests articles from the article database 204, the third topic A article 406 and the second topic B article 410 is transmitted to the device 202, along with the time of arrival of the articles and, in one embodiment, the initial score of the articles. At time 418, the device 202 calculates the time decayed scores for each of the received articles and displays the articles in the user interface based on the calculated scores. In the example shown, the first topic B article 408 is displayed first, followed by the third topic A article 406, the second topic B article 410, the second topic A article 404, and the first topic A article 404. In this manner, the cells 106 displayed in the user interface 104 of the reader application are organized based on the time decayed score associated with each article.

As shown in FIG. 4, the decay rate associated with each article may cause articles that are received later in time to be displayed in the feed above newer articles. In particular, although the third topic A article 406 is received after the first topic B article 408, the topic B article is displayed above the topic A article at time 418 in the reader application. This is because the decay rate for the topic B article 408 is less steep than the decay rate for the topic A article 406. In other words, if the articles are accessed by the reader application soon after the topic A article 408 is received, the topic A article may be displayed above the topic B article. However, because the reader application accesses the articles at a point later in time, the decay rate curve for the topic A article 406 causes it to have a time decayed score that is less than the time decay score for the topic B article 408.

Figure 5:
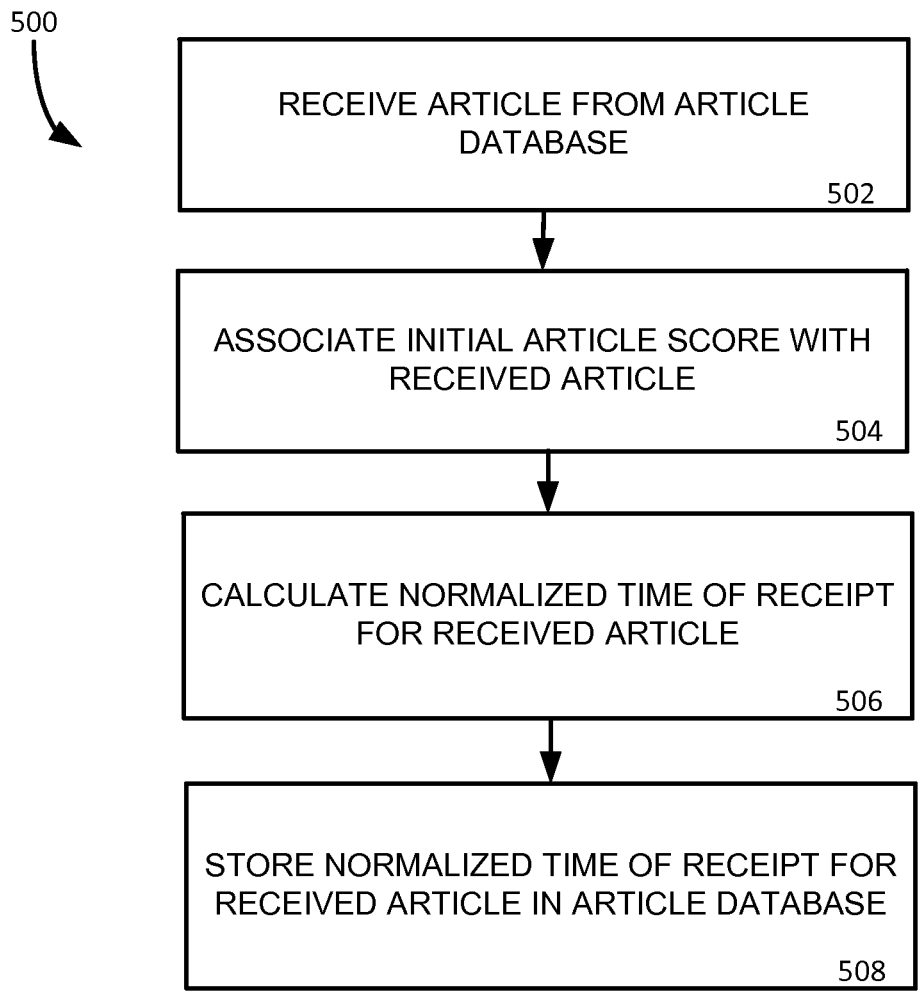
FIG. 5 is a flowchart for a method for the system to adjust a time receipt indicator associated with an article to normalize an initial score for the article.

To calculate the time decayed score for an article, the device 202 may utilize a time of arrival indicator for the article, a delay curve, and an initial score for the article. However, storing and transmitting the initial score for the articles of the article database 204 may consume system 200 resources. For example, as scores for the articles are adjusted by the system based on user feedback, updating and maintaining the score for each article may consume system 200 resources and reduce the efficiency of the system. Thus, FIG. 5 is a flowchart for a method for the system 200 to adjust a time receipt indicator associated with an article to normalize an initial score for the article. The operations of the method may be performed by any component or combination of components of the system 200, including the article scorer 212 in one particular embodiment. Through the method discussed, the system normalizes an initial score associated with an article to a common reference value. In one example, the common reference value is a common initial score value such that the time stamp associated with the article for arrival in the article database 204 is adjusted. In another example, the common reference value is a common point in time such that the initial score for the article is adjusted. Regardless of the embodiment utilized, one or more of the metrics associated with the article is normalized to a common value to reduce the amount of information stored by the system 200 associated with a particular article.

Beginning in operation 502, the system 200 receives an article at an article database 204. For example, the article miner 208 obtains the article and provides the article to the article database 204 for storing. Also, in operation 504, the system 200 determines an initial score for the article and associates the initial score with the article. The initial score may be determined through any of the methods discussed above, such as by analyzing the content of the article (title, publisher, length, etc.), providing the article to a set number of test devices through the exploration bin of the system, assigning the same initial score to each received article, or the like. Regardless of the method utilized to determine the initial score of the article, one or more of the articles in the article database 204 includes an initial score assigned by the system 200.

In operation 506, the system 200 calculates a normalized time of receipt for a particular article. As discussed above, the system normalizes an initial score associated with an article to a common reference value. Thus, in the example of the method 500, the system 200 adjusts a time associated with the article when the article was received at the article database 204 based on the initial score of the article. In another example not shown, the system 200 adjusts the initial score to equal a particular score at some point in the future. Regardless of whether the system 200 adjusts the time of arrival or the initial score of the article, the information associated with the articles of the database 204 are normalized to a common reference value such that less information pertaining to the article is stored and updated by the system 200.

Figure 6:
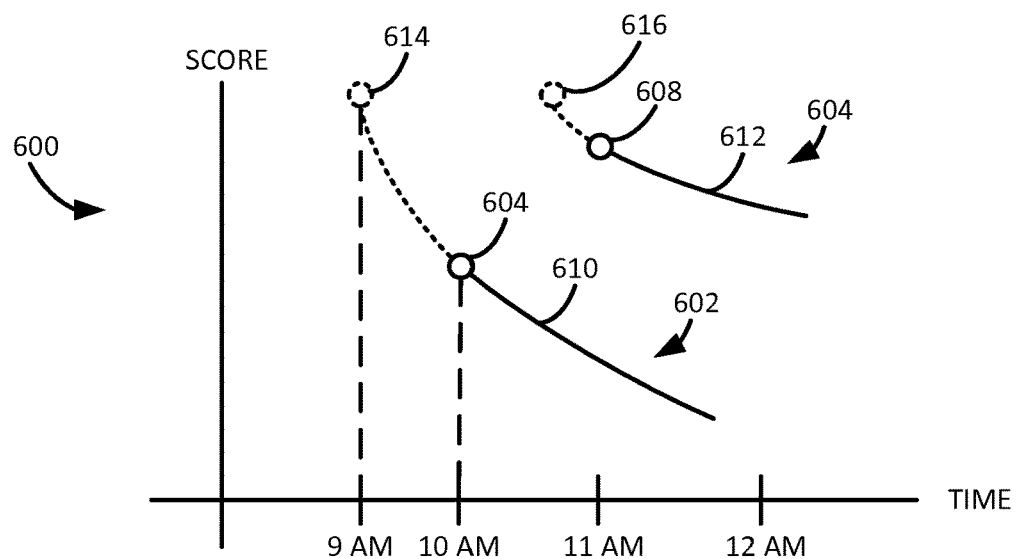
FIG. 6 is a graph illustrating adjusting time of receipt indicator of articles stored in an article database to a common reference value to normalize the scores associated with the articles.

FIG. 6 is a graph illustrating adjusting time of receipt indicator of articles stored in an article database 204 to a common reference value to normalize the scores associated with the articles. Similar to the graphs of FIGS. 3A-4, the graph 600 includes a time scale along the x-axis and an article score along the y-axis. The graph 600 also illustrates adjusting a time of arrival associated with two articles, article A 602 and article B 604. As described above, each received article includes an initial score 606-608 and a decay curve 610-612 that defines the rate at which the score associated with the articles decays over time. In the example shown, article A 602 arrives at 10:00 am with an initial score (as indicated by graph point 606) and article B arrives at 11:00 am with an initial score (as indicated by graph point 608). The initial score for article B 604 is higher than that of the initial score for article A 602.

In the example discussed above, for a device 202 to calculate a score for an article received at the device, an initial score for the article, a time of arrival of the article to the article database 204, and decay rate for the article score is utilized. This information may be stored and provided by the system 200 to the device 202 for the calculation. However, such information may be burdensome for the system to maintain for each article in the database 204. Thus, rather than storing the information, one or more of the article score values may be normalized to a common reference value. In one example, the common reference value is a perfect score for an article as determined by the system 200 or system administrator. In the particular example illustrated in FIG. 6, the time of arrival associated with each article 602-604 is normalized to a set initial score value. For example, article A 602 arrived at the article database 204 at 10:00 am with an initial score (as indicated by graph point 606). By utilizing the decay curve 610 of the article (as determined by one or more entities associated with the article), the system 200 determines an adjusted time of arrival. More particularly, the system 200 calculates an artificial or adjusted time of arrival 614 for the article as if the article was received with a particular normalized score, as indicated by graph point 614. In other words, utilizing the decay curve for the article, the system 200 calculates at which time 614 the article would have been stored at the article database 204 from the normalized score to achieve the initial score when the article actually arrived 606. In the example shown, the article would have the score indicated at point 606 at 10:00 am if the article was received at 9:00 am (point 614). In operation 508, the system 200 may then store the adjusted time of arrival indicator for the article in the article database 204.

Similar operations may also be applied to article B 604 upon arrival of the article at the article database 204. However, because the initial score for article B 604 (indicated at point 608) is higher than the initial score for article A 602, the adjustment to the time of arrival indicator for article B is less than that of article A. In other words, to achieve the initial score for the article when the article was actually received (point 608), the article would have been received at point 616 starting from a normalized score value, some time prior to the actual arrival time of 11:00 am.

In this manner, articles of the article database are provided with an assumed common reference score and are stored with an adjusted time of arrival indicator to adjust the score for the article back to the common reference score. As such, a device receiving the article calculates the article score from the adjusted time of arrival indicator and the decay curve associated with the article or entity. In other words, by normalizing the time of arrival to a common reference score, the system 200 need not maintain the initial score for the article and provide the score to the device 202 whenever the article is requested. Rather, the device 202 may assume the article is received with an initial score of the common reference score. Utilizing the assumed score, the device 202 calculates the decayed score for the article from the adjusted time of arrival of the article and the decay curve for the article. This method removes the process of frequent updates to the article database of the score of the articles by assuming a common score and determining an adjusted time of arrival, which may remain static through the lifecycle of the article in the system 200. The efficiency and operability of the system 200 is thereby increased as less information per article is maintained by the system.

In the embodiment discussed, the score of the article is normalized to a common reference score value. In another embodiment, the score of the article is normalized to a common reference time value. For example, the system 200 may determine some point in time in the future. The system 200 then calculates the anticipated score for the received article at the reference point in time. With this information, the system may set an initial score or time of arrival for the article that would match the calculated score at the future reference point in time. In other words, rather than normalizing the scores to a reference score, the system 200 normalizes the scores to a reference point in time. Regardless of the embodiment, the system 200 decreases the information stored for each article to determine the article score and stream-lines the score determining process.

During the lifecycle of the article in the system 200, the score associated with the article may be adjusted by the system in response to user feedback of the popularity of the article. For example, anonymous usage information may be received through the event relay 210 of the system that indicates a popularity of the article for users of the reader application on one or more devices 202. The gathering and processing of this popularity information is discussed in more detail below. With the usage information, the system may determine that the article is popular and, in response, increase the score associated with the article. In particular, the system 200 may further adjust the time of arrival indicator discussed above to improve or lessen the score associated with the article. For example, the time of arrival for a popular article (as determined from the received anonymous usage from the reader application) may be adjusted to indicate the article was received more recently. Similarly, the time of arrival for a less popular article may be adjusted to indicate the article was received further in the past. By adjusting the time of arrival indicator of the article, the system 200 biases popular articles higher in the reader application feed and less popular articles lower in the feed. This operates to increase the visibility of the popular articles in user feeds as determined by the likeability of the article by other users.

However, continual adjustment of the time of arrival of an article in the article database 204 may overload or overly burden the system 200. Thus, in one embodiment of the system 200, adjustments to the time of arrival indicator for an article based on anonymous user feedback are not conducted for minute or small changes to the article score. Rather, the system 200 may delay adjustments to the time of arrival indicator in the article database 204 until significant score adjustments are detected. For example, the system 200 may only adjust the score indicates that the time of arrival indicator should be adjusted by 30 minutes or more. This may be done to reduce the number of updates made to the database 204 to reduce the burden on the system 200 and increase system stability. However, the frequency at which the time of arrival indicators for the articles are adjusted may be determined and set by the system 200 or system administrator as desired. Other metrics that may be utilized by the system 200 to determine when adjustments to a time of arrival indicator is performed include, but are not limited to, the number of users exposed to the article, the time since the last adjustment to the time of arrival indicator, and the like.

Figure 8:
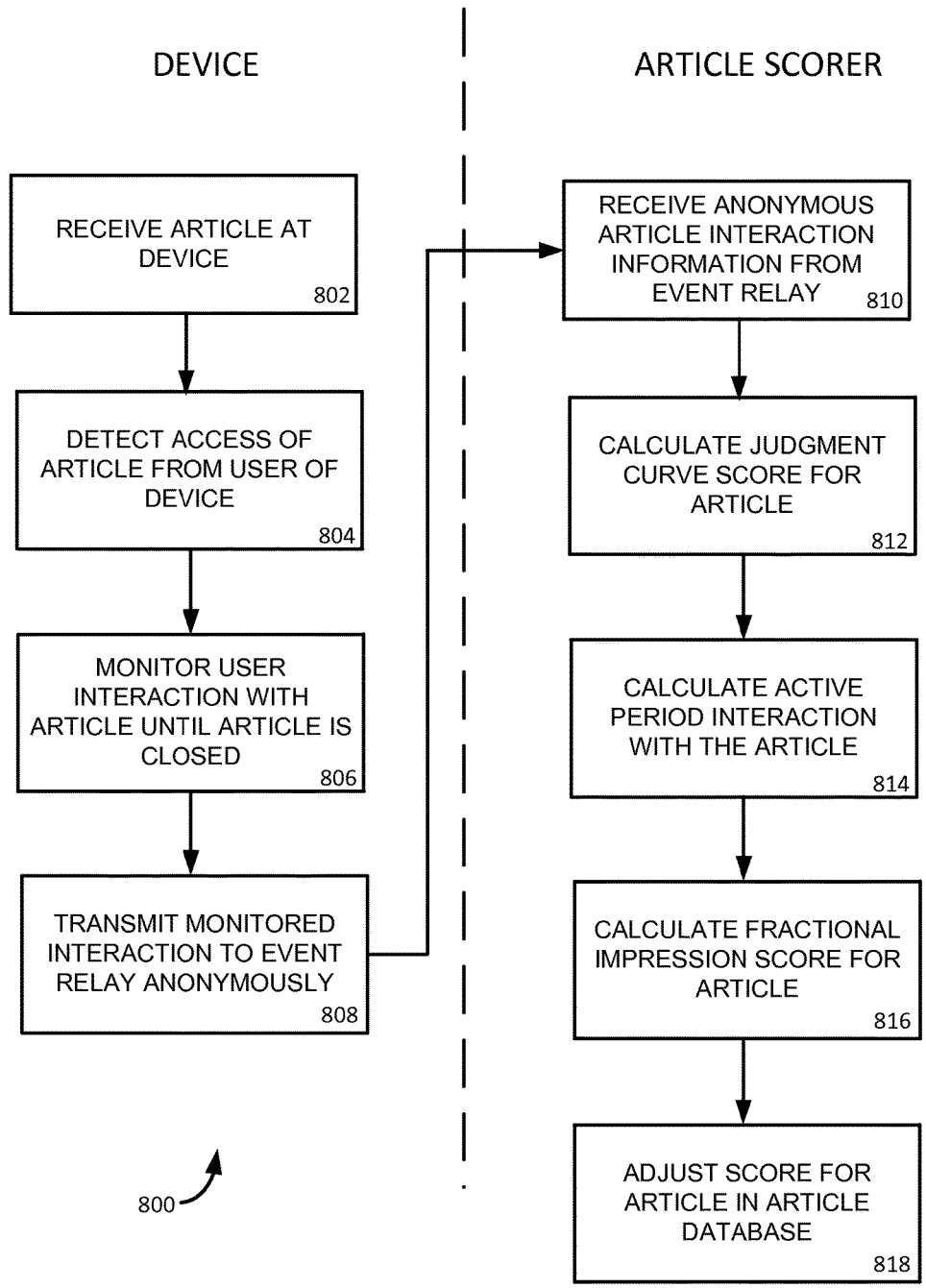
FIG. 8 is a flowchart for a method for monitoring usage activity of a particular article on a reader application and utilizing the monitored usage to adjust a relative score associated with the article.

As mentioned, the system 200 and, in particular, the event relay 210 may receive anonymous usage information pertaining to one or more articles available to users of one or more devices 202. FIG. 8 is a flowchart for a method for monitoring usage activity of a particular article on a reader application and utilizing the monitored usage to adjust a relative score associated with the article. As shown, the operations of the method of FIG. 8 are performed by the device 202 and the other components of the system 200, such as the article scorer 212. Through the operations of FIG. 8, the reader application and/or device are configured to monitor a user's interaction with an article. Such interaction may include if the article is clicked or otherwise accessed by the user, how long the user reads the article, the amount of activity with the article for the user, the device on which the article is read, and the like. When gathered, the device 202 may provide such usage information to the event relay 210. The system 200 may, in turn, utilize the monitored usage of the article to adjust the score of the article in the article database 204 as described above. In this manner, the system 200 determines which articles are popular among users of the reader application and increases the likelihood that a particular user will see the popular articles.

It should be noted that the system 200 obtains and/or receives the reader application usage information for an article anonymously. In particular, the information provided by the devices 202 may not include any identifying information about the device, the reader application, or the user of the reader application to the event relay 210. Thus, the system 200 may utilize usage information from several devices 202 to obtain an understanding of the relative popularity of the article without receiving identifying usage patterns for any particular user of the system. In this manner, determines the popularity of an article or articles, adjusts a score for the article accordingly, and biases popular articles to be shown in a reader application user interface while maintaining the privacy of the users of the system.

Operations 802-808 of the method 800 are performed by the device on which a reader application is executed and accessed by a user of the device. Beginning in operation 802, the device 202 receives an article from the system 200, perhaps in response to a request transmitted by the device to the system. In operation 804, the device 202 detects the access of the article in the user interface of the reader application by a user of the device. The article may be accessed by a user selecting a cell associated with the article through the user interface. Once launched in the user interface of the reader application, the device 202 monitors the usage of the article by the user, such as the length the article is read, a number and type of "article activities", and the like. At some later point, the user closes the article, which may also be noted by the device. In operation 808, the device 202 transmits the monitored interaction with the article to the event relay 210 of the system 200 for processing and adjusting of a score related to the article stored by the system. The usage information transmitted to the system 200 is anonymous in that the information contains no identifying information about a user of the device 202. Rather, the device 202 may transmit the information with an anonymous identifier that indicates the device is a part of the article-providing system 200, but does not identify the particular device or a particular user of the device. In this manner, the information provided about the usage of the article is anonymous to the system 200 of the user's identity.

Figure 7:
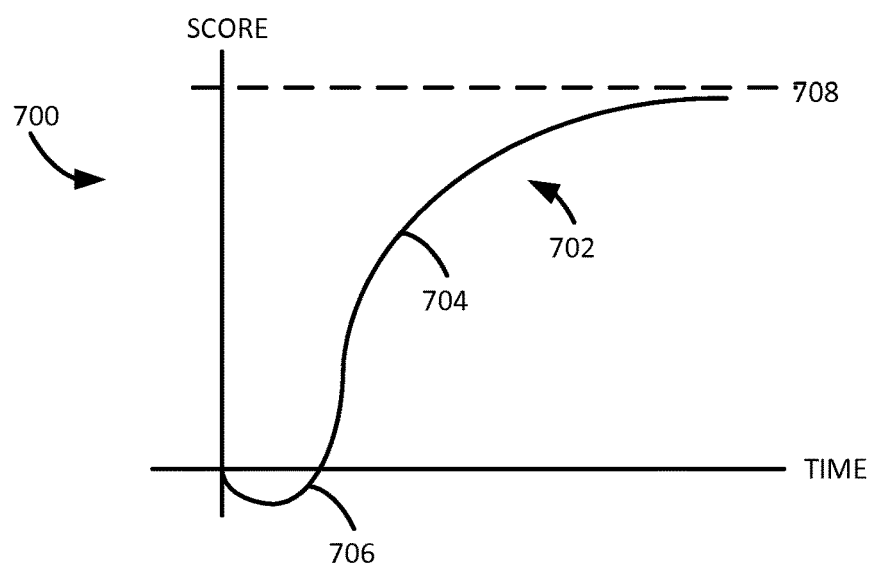
FIG. 7 is a graph illustrating a scoring curve that may be used by the system to provide a usage score when an article is viewed by a user.

In operation 810, the event relay 210 receives the anonymously transmitted information from the device 202 and transmits the monitored information to the article scorer 212. Further, the system 200 may receive such information from any number of devices 202 of the system. For example, a particular article may be provided to several hundred devices 202 associated with the system. Each reader application that receives the article may monitor the interaction with the article and provide such usage information to the system anonymously. The system 200, in return, may combine the usage information from the several devices 202 to determine the general popularity of the article. With the information, the article scorer 212 may determine adjustments to a score associated with one or more articles in the article database 204. For example, one metric monitored by the device or reader application and provided to the event relay 204 is the amount of time an article is read by a user. FIG. 7 is a graph 700 illustrating a scoring curve 702 that may be used by the system 200 to provide a usage score when an article is viewed by a user in operation 812 of the method 800 of FIG. 8. The graph 700 includes a time scale along the x-axis corresponding to a measured active time spent viewing an article and an article score along the y-axis corresponding to a usage score reported to the system for a particular article. Through the graph 700 illustrated, the system 200 determines a score based on how long an article is shown in a user interface of a reader application. In the graph 700 of FIG. 7, the scoring curve 702 includes a negative score portion 706 and a positive score portion 704 that rises quickly from the negative score portion before flattening out along a high score mark 708. However, although shown in the graph 700 with a particular pattern or curve, it should be appreciated that the scoring curve 702 utilized by the device to determine a score for a usage of an article may be any shape as desired by the system.

The score determined by the system 200 begins at time zero when the user of the reader application selects to view an article. The score curve 702 includes the negative portion 706 near the time when the user selects the article. In other words, if the user selects to view an article and soon thereafter decides to close the article in the user interface of the reader application (thereby ceasing the time spent viewing the article for the particular article viewing session), a negative score is associated with the article by the device 202. The negative portion 706 is included on the scoring curve 702 to account for the types of articles that entice a user to view the article, but may not be of interest when the article is viewed by the user. Such articles may include articles with misleading titles, inflammatory rhetoric, and/or objectionable content. As discussed in more detail below, the scale of the x-axis of the graph 700 may be adjusted in response to the length of the article. Thus, for short articles, the negative portion 706 of the score curve 702 may encompass a few seconds and, for longer articles, the negative portion may encompass a few minutes.

At some point along the time spent viewing the article, the score curve 702 includes a positive portion 704. In one example, the positive portion 704 includes a steep curve followed by a portion that flattens as it approaches an upper scoring limit 708. In other words, the score provided to an article may increase rapidly as the user views the article before slowly approaching an upper limit 708, or absolute high score. Through use of the scoring curve 702, the system 200 determines a score to associate with a viewed article for each viewing session through the reader application. In one embodiment, the system 200 utilizes the information provided by the device 202 of the user's interaction with the article to determine the score attributed to the article. In another embodiment, the device 202 itself may analyze the user's interaction with the article and provide the score according to the score curve 702 of the graph 700 of FIG. 7.

Figure 9A:
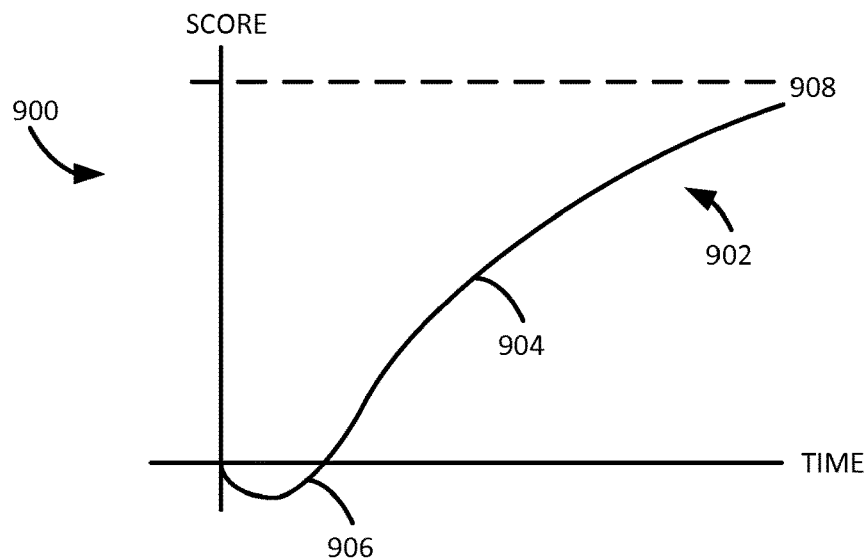
FIG. 9A is a graph illustrating a scoring curve that may be used by the system to provide a usage score for a relatively large or long article.

As mentioned above, the score curve for a user's interaction with an article may depend on the type and length of the article. For example, FIG. 9A is a graph illustrating a scoring curve that may be used by the system to provide a usage score for a relatively large or long article. The graph 900 of FIG. 9A is similar to that of FIG. 7, namely the graph 900 includes a time scale along the x-axis corresponding to a measured active time spent viewing an article and an article score along the y-axis corresponding to a usage score reported to the system for a particular article. Through the graph 900 the system 200 determines a score based on how long an article is shown or the length of time of user interaction with the article. The scoring curve 902 of the graph 900 includes a negative score portion 906 and a positive score portion 904 that rises from the negative score portion before flattening out along a high score mark 908.

Figure 9B:
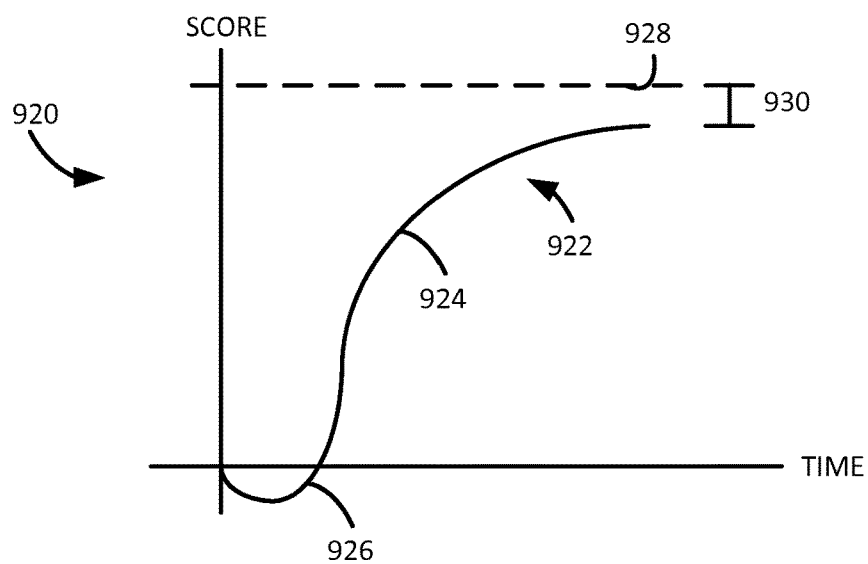
FIG. 9B is a graph illustrating a scoring curve that may be used by the system to provide a usage score for a relatively small or short article.

When compared to the scoring curve 702 of the graph 700 of FIG. 7, the positive portion 904 of the scoring curve 902 of the graph 900 of FIG. 9A rises less steeply. In other words, the score for the article increases more slowly the longer the user interacts with the article than that illustrated in FIG. 7. The slow rise 904 portion of the score curve 902 is utilized for longer articles as it may take more time for the system 200 to determine the engagement level of the article for the user. In contrast, FIG. 9B is a graph 920 illustrating a scoring curve 922 that may be used by the system to provide a usage score for a relatively small or short article. In particular, the score curve 922 for the short article includes a steep positive portion 924 as a reader of the article may consume the entire article in a short period of time. In addition, the score curve 922 may not flatten as the curve approaches an upper limit score 928 as in the previous score curve examples discussed above. Rather, the score curve 922 for the short article may approach an upper limit score value that is offset 930 by a "perfect article score" by a particular amount. For example, the system 200 may rank all articles through the scoring curve on a 0.0 to 1.0 scale, with a score of 1.0 indicating a perfect score. For long articles, the scoring curve 902 may approach a score of 1.0 the longer the article is viewed by the user. For a short article, the scoring curve 922 may approach a smaller upper limit score (such at 0.8), with an upper limit score offset 930 of 0.2. The lower upper limit score for shorter articles may be included in the system 200 to bias longer articles over shorter article as longer articles may be of more interest to users of the reader application.

Figure 10:
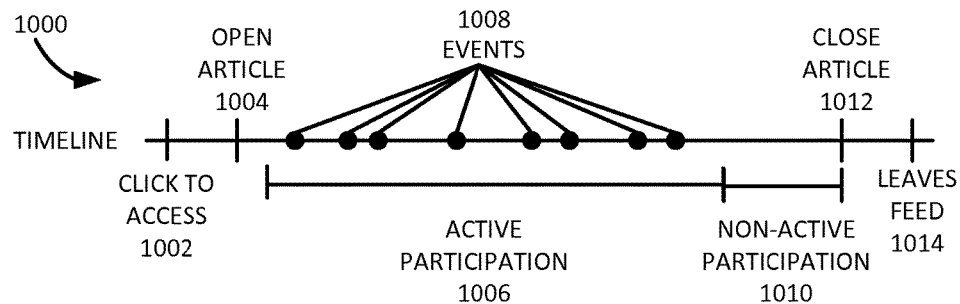
FIG. 10 is illustration of a timeline of a user's interaction with an article through a reader application.

Returning to the method 800 of FIG. 8, the system 200 calculates an active time spent score for the article in operation 814 based on anonymous user activity provided by a device 202 of the system. For example, FIG. 10 is illustration of a timeline of a user's interaction with an article through a reader application. As illustrated, the timeline 1000 includes a point in time in which a user accesses or launches the reader application (time 1002). At some later time, the user taps or otherwise accesses an article in the user's feed of articles (time 1004) and begins to read or otherwise interact with the article. Over a period of time (time 1006), the user interacts with the article. The period of interaction 1006 is marked by the reader application or the device by detecting one or more events 1008 that occur within the period of interaction. Such events may be any indication that the user is still engaged with the article, such as taps to access portions of the article, such as clicking a link in the article, watching a video, enlarging a photo or animation in the article, and the like and scrolling to read more of the article. In general, any measureable interaction with a displayed article may be considered an event 1008 that indicates the user is engaged with the article.

In addition, the timeline 1000 may include a period of measured non-active participation 1010 with the article. Contrary to periods of active participation 1006, periods of non-active participation 1010 include those portions where no event 1008 is measured or detected in the reader application. Periods of non-active participation 1010 may occur when the user navigates away from the reader application on the device 202, such as to take a phone call on a mobile device or the reader's attention is generally pulled away from the reader application. These times of non-active participation 1010 are noted by the reader application or the device 202 and considered by the system 200 when adjusting a score associated with an article.

Typically, there are several instances of non-activity between measured events 1008. Thus, in one implementation, a period of non-active participation may pass a particular threshold before being noted as a noted period of non-active participation 1010. For example, the system 200 may require a period of one minute between detecting an event 1008 on the device 202 before the system 200 qualifies the period as a non-active participation period 1010. Those periods between events 1008 that occur within the threshold value may not be considered non-active participation period 1010, but rather are still noted by the system 200 as being within the active. Further, the period between events allowable by the system 200 before determining a non-active participation period 1010 may be based on the size or type of device on which the article is viewed. For example, if the article is viewed on a device with a large screen, it may take longer before the user scrolls the article to access more content. Conversely, on a relatively smaller screen or display, the user may scroll the article often. Thus, the type of device the user utilizes to execute the reader application and view an article may affect the allowed time between events that are considered active participation. In general, the threshold time period between events 1008 that determine a period of non-active participation may be any period as desired by the system 200 or an administrator of the system.

At some point on the timeline 1000, the user closes the article in the reader application (time 1012), followed by a time at which the user closes the reader application (time 1014). The timeline 1000 illustrated in FIG. 10 is one example of an interaction with an article by a user of a reader application. Other interaction timelines with an article may be detected by the device 202, including periods of activity 1006, events 1008, and periods of non-activity 1010 in any order and for any period of time.

The information obtained from the timeline 1000 of a user's interaction with an article may be utilized by the system 200 to determine an interest level in the article. For example, the system 200 may utilize the information to determine a score for the article based on the score curves discussed above. For example, the device collects the interaction timeline of a user's interaction with an article. This information is provided to the system 200 through the event relay 210 to the article scorer 212. The article scorer 212 may use the timeline interaction 1000 information and a score curve graph associated with the particular article the user viewed to determine a score to apply to the article. In particular, the user's time interacting with the article is determined from the timeline 1000 and used to determine the score on the score curve for the article. In this manner, the user's interactions with a particular article is monitored and utilized to determine an interest score in the article for the user.

Figure 11:
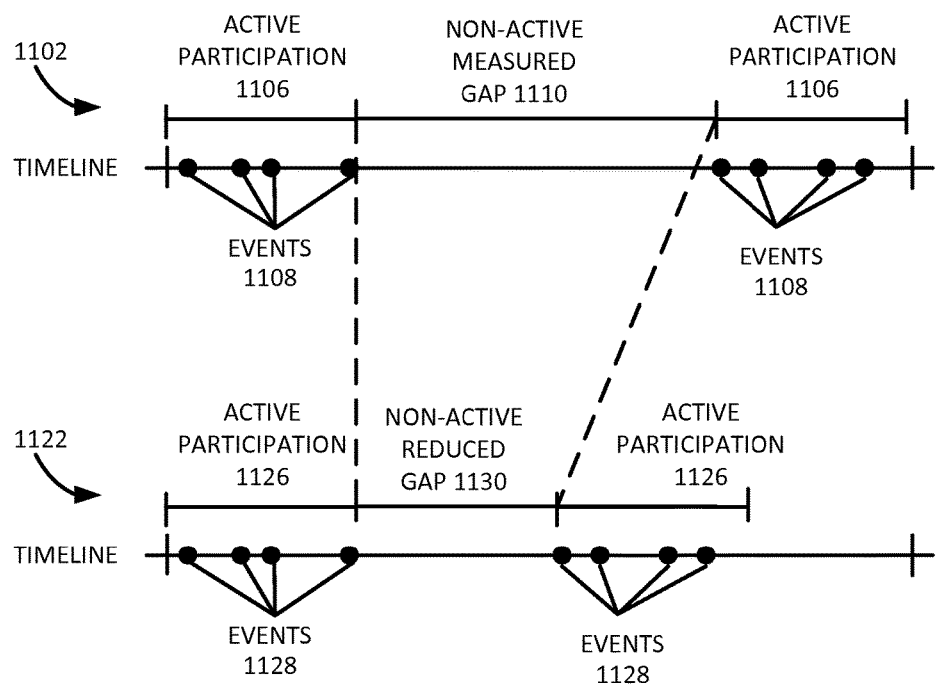
FIG. 11 illustrates a timeline of user interaction with an article with a non-active participation period and a corresponding timeline with a reduced non-active participation period.

In one implementation, the detected periods of non-active participation 1010 may be reduced to a generic or set period of non-active participation. For example, FIG. 11 illustrates a timeline 1102 of user interaction with an article with a non-active participation period 1110 and a corresponding timeline 1122 with a reduced non-active participation period 1130. Similar to the timeline discussed above, the timelines 1102,1122 of FIG. 11 include detected events 1108,1128 that define a period of active participation 1106,1126 and a period of non-active participation 1110,1130. Timeline 1102 illustrates the actual measured timeline of interaction with an article by a user of the reader application on a device 202. Timeline 1122 is a corresponding timeline to the measured timeline of interaction that includes the same portions of active participation 1126 and detected events 1128. However, the adjusted timeline 1122 includes a reduced non-active participation gap 1130 corresponding to the non-active participation portion 1110 of the actual measured timeline 1102. In general, the system 200 reduces the measured non-active participation gaps 1110 to a set reduced non-active participation gap 1130. The system 200 may reduce the measured non-active participation periods 1110 to the set reduced non-active participation period 1130 because the measured non-active participation period may be long relative to the active participation periods 1106. For example, a non-active participation period 1110 may last for an hour or more as a user is distracted or pulled away from the reader application, such as during a meeting or the user receives a phone call while reading. However, the length of a non-active participation period may not be useful for the system 200 after a particular length of time. Rather, the system 200 may be interested in the simple occurrence of a non-active participation period 1110, without necessarily utilizing the full length of the non-active participation period.

The length of the reduced non-active participation period 1130 may be any length of time as desired by the system 200. Further, the reduced non-active participation period 1130 may be based on the article viewed in the reader application. In any event, the system 200 may disregard the length of the measured non-active participation period 1110 and substitute the measured non-active participation period with a reduced non-active participation period 1130 in the timeline 1122 of the user's interaction with the article. In addition, the reduced non-active participation period 1130 may be associated with the timeline 1122 of the user's interaction with the article by the device or may be associated by the system.

Returning to the method 800 of FIG. 8, the system 200 calculates a fractional impression score for the article viewing event. Typically, the popularity of a webpage or web-based article is determined from a click-through rate when a link or other access portal to the webpage or article is provided to a viewer. The click-through rate divides the number of times the webpage or article is viewed by the number of times the link to the webpage or article is presented to a viewer. For example, a link or cell for an article may be presented in ten user's article feeds through the reader application. If two of the ten user's select to view the article, the article is attributed a 0.20 or 20% click-through rate. The calculated click-through rate provides some indication to the system 200 of the effectiveness of the link or cell to get a user of the reader application to access the linked to article.

However, not all cells for articles presented in a user interface for the reader application are alike. Rather, cells may be of different sizes and include different portions of the article. For example, a cell for article A may be of a first size and include the article title, an image, and a portion of the title text. Conversely, a cell for article B may be of a smaller size and only include the title or include a small synopsis of the contents of the article. Therefore, calculating a pure click-through rate for articles that have different types of cells or links to the articles may not provide an accurate assessment of the articles popularity or appeal. Thus, in one implementation of the present disclosure, the system 200 may adjust the calculated click-through rate to account for the different types of impressions or cells for the articles. In particular, the system 200 may assign a fractional value between zero and one for each cell presented to a user by the reader application. The fractional value is based on the type and size of the cell. In general, larger cells with more content included in the cell have a higher fractional value, while smaller cells with less content have a smaller fractional value. In determining a fractional impression score for a cell, the system 200 may utilize any aspect of the cell or link, including the size of the cell, the presence of a title, picture, video, or portion of the article in the cell, and/or the length of time the cell is present in the user's feed of articles.

For example, an article may be provided to ten reader applications. In three of the reader applications, a first type of cell is presented in the user interface of the reader application. The first type of cell is generally larger than the other cells in the user interface and includes a title, an image, and a portion of text of the article. In the other seven reader applications, a second type of cell is presented in the user interface of the reader application. The second type of cell is generally small and includes only a title of the article. In this example, the system may assign a fractional score of 0.8 to the first type of cell and a score of 0.3 to the second type of cell. Also assume that the eight of the ten users of the reader applications click the respective cell to view the article. The system 200 may calculate the fractional impression click-through rate (FICTR) as the number of click-throughs of the article divided by the sum of all of the fractional impressions provided to the reader applications. In this example, $FICTR=8/((0.8*3)+(0.3*7))=0.423$. As such, the FICTR for the particular article based on the fractional impressions assigned to the cells provides a weighted score that portrays the popularity or appeal of the article taking into account the types of impressions the cells for the article makes. This fractional impression score may be more accurate than a click-through rate score that only measures the accesses of the article without considering the type of cell through which the article is accessed.

Returning to the method 800 of FIG. 8, the system 200 may adjust a score associated with an article in operation 818. In particular, the article scorer 212 may utilize the calculated judgment curve score, the active period interaction, and/or the fractional impression calculation to determine an adjustment to a score (or an initial score in some instances) for the article. In this manner, anonymous user feedback from the user's interaction with an article may cause the system 200 to adjust the score associated with the article to indicate a general popular opinion about the article and bias the more popular articles in one or more user feeds of articles.

Figure 12:
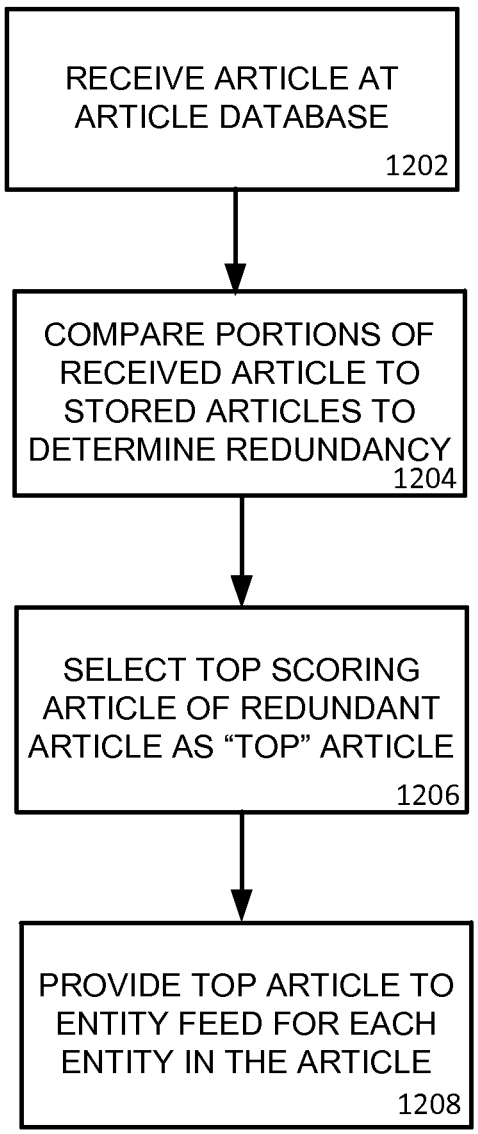
FIG. 12 is a flowchart for a method for the system to determine a redundant article and select a best article to provide to a reader application.

The article score may also be utilized by the system 200 to determine when a received article is redundant to a previously stored article and provide a best or top article to one or more reader applications. For example, FIG. 12 is a flowchart for a method for the system to determine a redundant article and select a best article to provide to a reader application. The operations of the flowchart are performed by one or more components of the system 200, such as the article scorer 212 or the article database 204. In general, the method 1200 removes redundant articles from a reader application for a particular selected entity such that the article feed displayed in the reader application does not include several instances of the same article, such as a breaking news story.

Beginning in operation 1202, the system 200 receives a new article from the article miner 208. The new article is then compared to other stored articles in the article database 204 to determine the similarity between the newly received article and the stored articles in operation 1204. In particular, the system 200 compares portions of the new article to similar portions of stored articles to determine a similarity. For example, the system 200 may obtain a title of the articles, one or more determined entities of the articles, and/or a portion of the text of the articles and execute one or more software commands to compare the similarity of the titles and the obtained entities. From this comparison, a probability that the new article is redundant to one or more stored articles is calculated. In one implementation, the new article may be noted by the system 200 as a "same story" article, a "same event" article, or an "unrelated" article. New articles that are labeled as a same story or same event article are redundant to a previously stored article.

In one implementation, the number of stored articles to which the new article is compared may be limited. In one example, the new article with a particular entity is compared to the top 100 articles for that entity based on the score associated with the article. In another example, the new article may be compared only to those articles in the article database 204 that were stored in the previous 24 hour period. Regardless of how many articles to which the new article is compared, the similarity probability score is calculated by the system 200.

In operation 1206, the system 200 determines a best article of the identified redundant articles to provide to reader application article feeds. In particular, the system 200 utilizes the scores of the articles identified as redundant to each other to determine the article with the highest score. In general, the system 200 provides the article with the highest score of the identified redundant articles to provide to the devices 202 for viewing by users of the reader applications. Thus, in operation 1208, the system 200 provides the top article based on the scores associated with the articles to an entity feed of a reader application of a device.

In one implementation, the top redundant article provided to the devices 202 may be particular to an entity to which a reader application is subscribed. For example, a received article may be associated with several entities and may be redundant to several other articles in the article database 204. Further, the received article may be the highest scoring article to all other redundant articles for a first entity (Entity A). In this circumstance, the received article is provided to reader applications that have feeds subscribed to Entity A. However, the received article may also be associated with a second entity (Entity B). For all of the articles to which the received article is redundant, several of the redundant articles may be associated with Entity B. Further, the received article may not be highest scoring article for the collection of redundant articles associated with Entity B. Thus, the received article is not provided to those subscribers to Entity B as there is another redundant article associated with Entity B with a higher score. In this manner, a redundant article may be provided as a top article for some users of the reader application, but not others.

Figure 13:
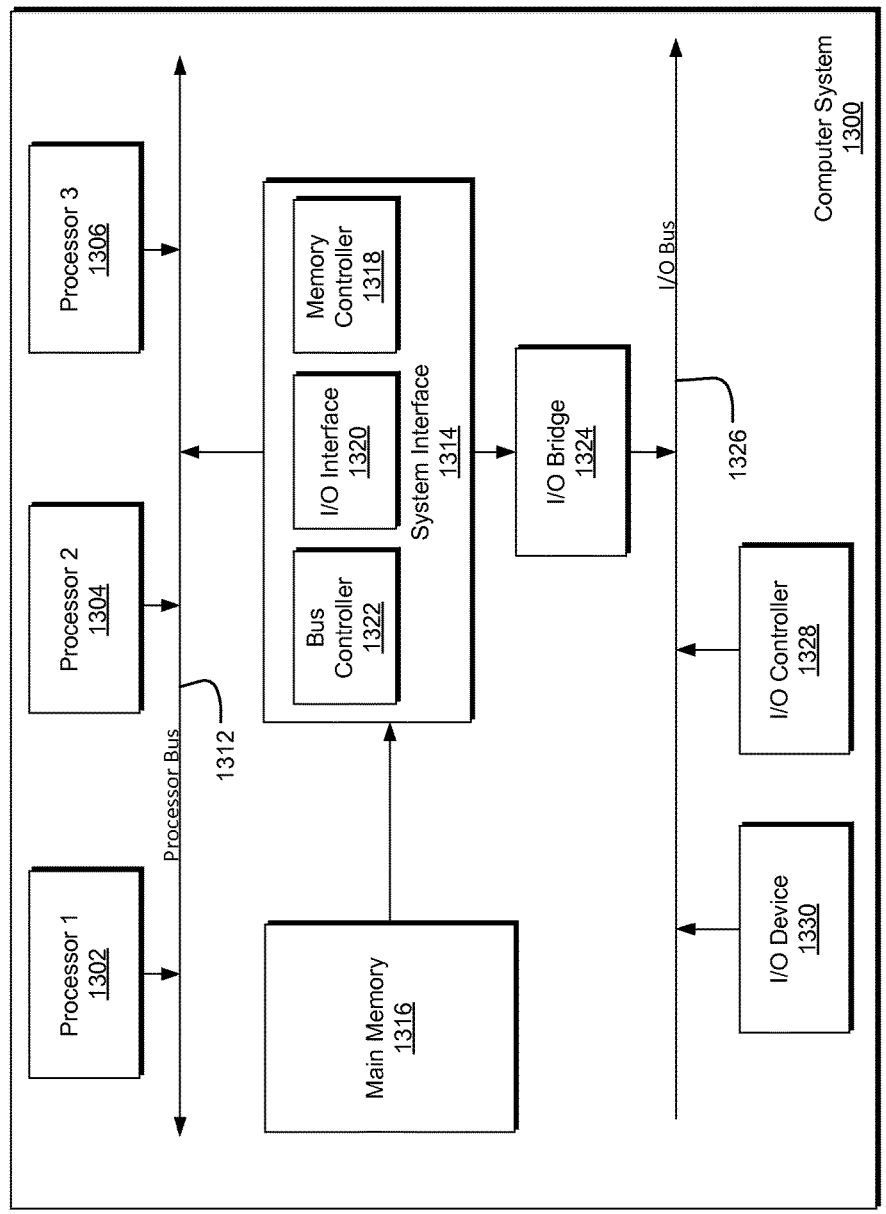
FIG. 13 is an example computing system that may implement various systems and methods discussed herein.

FIG. 13 is a block diagram illustrating an example of a computing device or computer system 1300 which may be used in implementing the embodiments of the present disclosure. For example, the computing system 1300 of FIG. 13 may be a portion of the device 202 or article scorer 212 of the system 200. The computer system includes one or more processors 1302-1306. Processors 1302-1306 may include one or more internal levels of cache (not shown) and a bus controller or bus interface unit to direct interaction with the processor bus 1312. Processor bus 1312, also known as the host bus or the front side bus, may be used to couple the processors 1302-1306 with the computer system interface 1314. Computer system interface 1314 may be connected to the processor bus 1312 to interface other components of the computer system 1300 with the processor bus 1312. For example, computer system interface 1314 may include a memory controller 1313 for interfacing a main memory 1316 with the processor bus 1312. The main memory 1316 typically includes one or more memory cards and a control circuit (not shown). Computer system interface 1314 may also include an input/output (I/O) interface 1320 to interface one or more I/O bridges or I/O devices with the processor bus 1312. One or more I/O controllers and/or I/O devices may be connected with the I/O bus 1326, such as I/O controller 1328 and I/O device 1330, as illustrated.

I/O device 1330 may also include an input device (not shown), such as an alphanumeric input device, including alphanumeric and other keys for communicating information and/or command selections to the processors 1302-1306. Another type of user input device includes cursor control, such as a mouse, a trackball, or cursor direction keys for communicating direction information and command selections to the processors 1302-1306 and for controlling cursor movement on the display device.

Computer system 1300 may include a dynamic storage device, referred to as main memory 1316, or a random access memory (RAM) or other computer-readable devices coupled to the processor bus 1312 for storing information and instructions to be executed by the processors 1302-1306. Main memory 1316 also may be used for storing temporary variables or other intermediate information during execution of instructions by the processors 1302-1306. System 1300 may include a read only memory (ROM) and/or other static storage device coupled to the processor bus 1312 for storing static information and instructions for the processors 1302-1306. The system set forth in FIG. 13 is but one possible example of a computer system that may employ or be configured in accordance with aspects of the present disclosure.

According to one embodiment, the above techniques may be performed by computer system 1300 in response to processor 1304 executing one or more sequences of one or more instructions contained in main memory 1316. These instructions may be read into main memory 1316 from another machine-readable medium, such as a storage device. Execution of the sequences of instructions contained in main memory 1316 may cause processors 1302-1306 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1316. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 14:
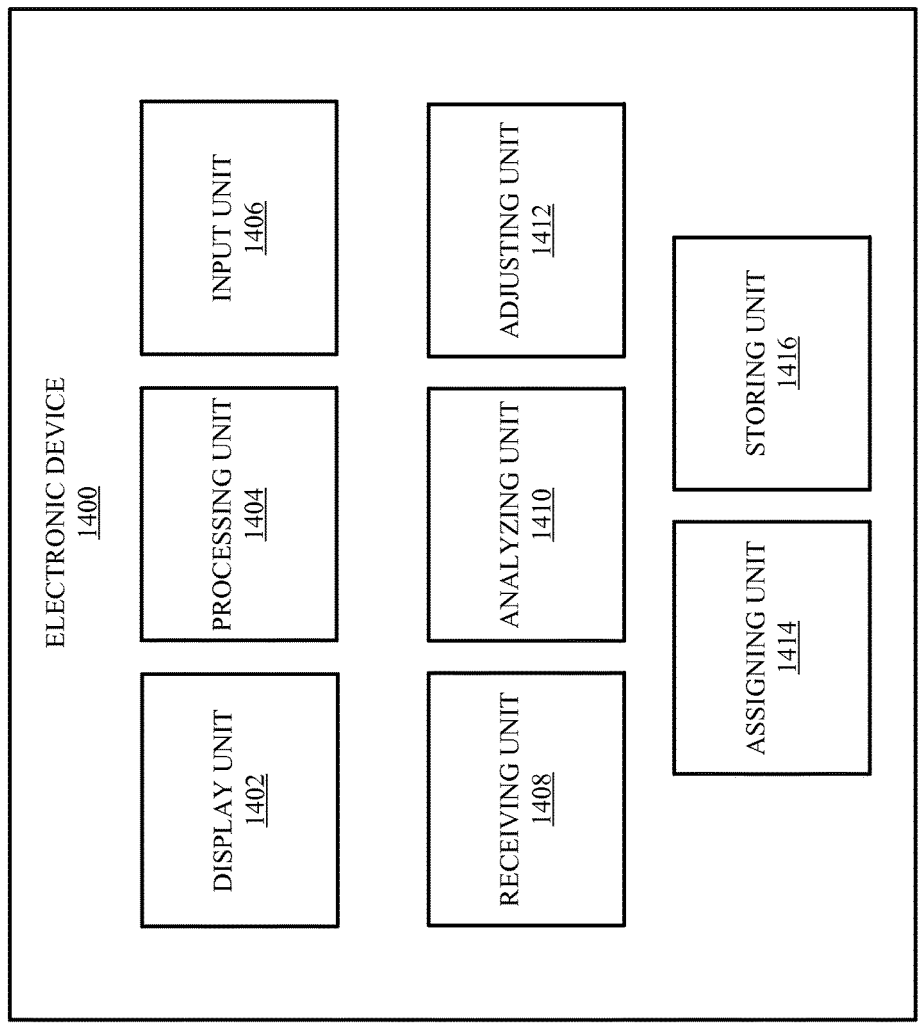
FIG. 14 is a functional block diagram of an electronic device including operational units arranged to perform various operations of a reader application.

FIG. 14 is a functional block diagram of an electronic device including operational units arranged to perform various operations of a reader application. The operational units 1402-1416 of the device 1400 are implemented by hardware or a combination of hardware and software to carry out the principles of the present disclosure. It will be understood by persons of skill in the art that the operational units 1402-1416 described in FIG. 14 may be combined or separated into sub-blocks to implement the principles of the present disclosure. Therefore, the description herein supports any possible combination or separation or further definition of the operational units 1402-1416.

In one implementation, the electronic device 1400 includes a display unit 1402 configured to display information, such as a graphical user interface, and a processing unit 1404 in communication with the display unit 802 and an input unit 1406 configured to receive data from one or more input devices or systems. Various operations described herein may be implemented by the processing unit 1404 using data received by the input unit 1406 to output information for display using the display unit 1402. Further, one or more of the units of the device 1400 may be included in the computer system 1100 described above.

Additionally, in one implementation, the electronic device 1400 includes units implementing the operations described herein. For example, a receiving unit 1408 may receive electronic content comprising an article-based computing file received at a first time of arrival. An analyzing unit 1410 may analyze the received content file to determine an initial quality estimate of the received content file and an adjusting unit 1412 may adjust a priority of the received content file based at least on the initial quality estimate of the received content, the adjusted priority of the received content file comprising a second time of arrival, the second time of arrival before the first time of arrival. The assigning unit 1414 assigns an initial score value to the received content comprising the adjusted priority and a storing unit 1416 stores the received content file and the initial score value of the received content in a content database.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the parties responsible for the collection, analysis, disclosure, transfer, storage, or other use of such personal information data will comply with well-established privacy policies and/or privacy practices. In particular, such parties should implement and consistently use privacy policies and practices that are generally recognized as meeting or exceeding industry or governmental requirements for maintaining personal information data private and secure. For example, personal information from users should be collected for legitimate and reasonable uses of the party and not shared or sold outside of those legitimate uses. Further, such collection should occur only after receiving the informed consent of the users. Additionally, such parties would take any needed steps for safeguarding and securing access to such personal information data and ensuring that others with access to the personal information data adhere to their privacy policies and procedures. Further, such parties can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

What is claimed is:

1. A method for managing content in a content database, the method comprising:
   receiving electronic content comprising an article received at a first time of arrival;
   analyzing the article to determine an initial score of the article;
   determining an adjusted arrival time of the article normalized to a common reference value based at least on the initial score of the article and a decay curve of the article over time, the adjusted arrival time of the article comprising a second time of arrival before the first time of arrival;
   assigning the common reference value to the article as an article score;
   storing the article, the adjusted arrival time of the article, and the article score of the article in a content database;
   providing the article to a plurality of computing devices executing a reader application; and
   receiving at least one user interaction from the plurality of computing devices executing a reader application.

2. The method of claim 1 wherein the at least one user interaction comprises an indication of a length of time the reader application is engaged with the article, the method further comprising:
   adjusting the initial score of the article based at least on the at least one user interaction.

3. The method of claim 1 wherein the at least one user interaction comprises a period of non-activity with the article on the reader application, the method further comprising: adjusting the initial score of the article based at least on the at least one user interaction.

4. The method of claim 3 further comprising: reducing the period of non-activity with the article to a smaller period of non-activity.

5. The method of claim 1 wherein the at least one user interaction comprises an indication of a type of cell displayed in a display interface associated with the article, the display interface comprising a portion of the reader application, the method further comprising:

adjusting the initial score of the article based at least on the at least one user interaction.

6. The method of claim 1 wherein the at least one user interaction from the plurality of computing devices executing a reader application comprises anonymous information of the use of the article, the anonymous information not including an identification of a user of the plurality of computing devices.

7. The method of claim 1 wherein the initial score is based on at least one of a publisher of the article, a length of the article, or a number of paragraphs of the article.

8. A system for file sharing, the system comprising:
an article miner comprising a first processor and a first memory, wherein the first memory comprises one or more executable miner instructions stored thereon, wherein the first processor executes the one or more miner instructions to perform the operations of obtaining a plurality of articles from a network of article sources and assigning a time of obtaining to each of the plurality of articles;
an article scorer comprising a second processor and a second memory, wherein the second memory comprises one or more executable scorer instructions stored thereon, wherein the second processor executes the one or more scorer instructions to perform the operation of analyzing the plurality of articles to determine an adjusted arrival time for each article of the plurality of articles normalized to a common reference value based at least on an initial score of each article and a decay curve of each article over time, wherein the second processor executes the one or more scorer instructions to perform the operation of assigning the common reference value to each article of the plurality of articles as an article score, wherein the adjusted arrival time of each article is earlier than the respective assigned time of obtaining of the respective article;
an article database comprising a third processor and a third memory, wherein the third memory comprises one or more executable database instructions stored thereon, wherein the third processor executes the one or more database instructions to perform the operation of storing the plurality of articles, the adjusted arrival time of each article, and the article score for each of the plurality of articles;
a device server comprising a fourth processor and a fourth memory, wherein the fourth memory comprises one or more executable server instructions stored thereon, wherein the fourth processor executes the one or more server instructions to perform the operations of retrieving a first article of the plurality of articles and transmitting the first article of the plurality of articles to a plurality of user device over a network; and
an event relay comprising a fifth processor and a fifth memory, wherein the fifth memory comprises one or more executable relay instructions stored thereon, wherein the fifth processor executes the one or more relay instructions to perform the operation of receiving at least one user interaction from the plurality of user devices executing a reader application.

9. The system of claim 8 wherein the at least one user interaction comprises an indication of a length of time the reader application is engaged with the first article and the article scorer adjusts the initial score of the first article based at least on the at least one user interaction.

10. The system of claim 8 wherein the at least one user interaction comprises a period of non-activity with the first article on the reader application and the article scorer adjusts the initial score of the first article based at least on the at least one user interaction.

11. The system of claim 8 wherein the at least one user interaction comprises an indication of a type of cell displayed in a display interface associated with the first article, the display interface comprising a portion of the reader application and the article scorer adjusts the initial score of the first article based at least on the at least one user interaction.

12. The system of claim 8 wherein the at least one user interaction from the plurality of user devices executing a reader application comprises anonymous information of the use of the first article, the anonymous information not including an identification of a user of the plurality of user devices.

13. The system of claim 8 wherein the initial score assigned to each of the obtained plurality of articles is based at least on one of a publisher of the particular article, a length of the particular article, or a number of paragraphs of the particular article.

14. A scoring device for an article-providing system, the device comprising:
at least one processor; and
a tangible computer-readable medium with one or more executable instructions stored thereon, wherein the at least one processor executes the one or more instructions to perform the operations of:
receiving electronic content comprising an article;
associating a time of arrival with the article;
analyzing the article to determine an initial score of the article;
determining an adjusted arrival time of the article normalized to a common reference value based at least on the initial score of the article and a decay curve of the article over time, the adjusted arrival time of the article comprising a second time of arrival before the first time of arrival;
assigning the common reference value to the article as an article score;
storing the article, the adjusted arrival time of the article, and the article score of the article in a content database;
providing the article to a plurality of computing devices executing a reader application; and
receiving at least one user interaction from the plurality of computing devices executing a reader application.

15. The scoring device of claim 14 wherein the at least one user interaction comprises an indication of a length of time the reader application is engaged with article and the instructions further cause the at least one processor to:
adjust the initial score of the article based at least on the at least one user interaction.

16. The scoring device of claim 14 wherein the at least one user interaction comprises an indication of a type of cell displayed in a display interface associated with the article, the display interface comprising a portion of the reader application and the instructions further cause the at least one processor to:
adjust the initial score of the article based at least on the at least one user interaction.

* * * * *